United States Patent [19]
Welsch et al.

[11] Patent Number: 5,434,881
[45] Date of Patent: Jul. 18, 1995

[54] DIFFUSION-COOLED $CO_2$ STRIPLINE LASER HAVING REDUCED IGNITION VOLTAGE

[75] Inventors: Wolfgang Welsch, Vaterstetten; Hans Krueger, Munich; Wolfgang Guenther, Munich, all of Germany

[73] Assignee: Siemens Aktiengesellschaft, Munich, Germany

[21] Appl. No.: 126,036

[22] Filed: Sep. 23, 1993

[30] Foreign Application Priority Data

Sep. 30, 1992 [DE] Germany .................. 42 32 843.8

[51] Int. Cl.[6] ............................................. H01S 3/097
[52] U.S. Cl. ............................... 372/87; 372/64; 372/82
[58] Field of Search ........................ 372/64, 86, 87, 34

[56] References Cited

U.S. PATENT DOCUMENTS

| | | | |
|---|---|---|---|
| 4,509,176 | 4/1985 | Marchretti et al. | 372/86 |
| 4,597,086 | 6/1986 | Kimbara | 372/82 |
| 4,637,030 | 1/1987 | Midavaine et al. | 372/82 |
| 4,885,754 | 12/1989 | Egawa | 372/86 |
| 4,935,933 | 6/1990 | Karube et al. | 372/82 |
| 4,937,834 | 6/1990 | Egawa | 372/82 |
| 5,140,606 | 8/1992 | Yarborough et al. | 372/64 |

Primary Examiner—Leon Scott, Jr.
Attorney, Agent, or Firm—Hill, Steadman & Simpson

[57] ABSTRACT

A diffusion-cooled $CO_2$ stripline laser having reduced ignition voltage is provided. In order to facilitate the ignition of the stripline laser, an auxiliary discharge path is provided which is formed either by segmentation of the HF electrode or by at least one auxiliary electrode that is arranged along the electrode surface and adjacent to the discharge path.

8 Claims, 1 Drawing Sheet

DIFFUSION-COOLED CO2 STRIPLINE LASER HAVING REDUCED IGNITION VOLTAGE

BACKGROUND OF THE INVENTION

The invention is directed to an HF-excited, diffusion-cooled $CO_2$. stripline laser having a grounding electrode and an HF metal electrode, each of which respectively comprises an essentially rectangular electrode surface between which a discharge path is formed.

An article by R. Novack et al, "Diffusionsgekuehlte $CO_2$-Hocheistungslaser in Kompaktbauweise" in Laser und Optoelektronik", 23 (3)/1991 is referenced to the prior art of stripline lasers. The known stripline lasers are constructed of two metal electrodes that are provided with cooling channels and with means for mutual fixing, and between which a discharge gap is formed. The electrodes comprise waveguide surfaces facing toward the discharge gap whose width amounts to a multiple of their spacing. Two resonator mirrors that form an unstable resonator are also necessary. Although these lasers can be fundamentally ignited without problems, the ignition event can take several seconds given a laser newly placed into operation, or given a laser that was not in operation over a longer time span. Such a long response time, however, cannot be tolerated in some applications.

SUMMARY OF THE INVENTION

An object of the invention is to create a laser of the type initially cited with which the laser discharge can be ignited more reliably, faster and with less ignition energy than previously, but without great structural expense. In general, an improved response of the laser should be assured given pulsed operation.

This object is achieved according to the present invention in that the HF electrode is segmented into at least two electrically separated surface elements having separate HF feed. At least one auxiliary discharge can be ignited on a part of the discharge path between at least one of the surface elements and the grounding electrode. The gain in the laser up to the ignition of a main discharge on the remaining part of the discharge path lies below the laser threshold.

The object is also achieved according to the invention in that an additional electrode is provided at at least one location along the electrode surfaces, this additional electrode together with the grounding electrode or with a second additional electrode forming an auxiliary discharge path on which an HF or DC voltage auxiliary discharge can be ignited. The auxiliary discharge is adjacent to the discharge path and at least some of the ions generated in the auxiliary discharge are present in the region of the discharge path for the ignition thereof.

DESCRIPTION OF THE PREFERRED EMBODIMENTS

Figure 1:
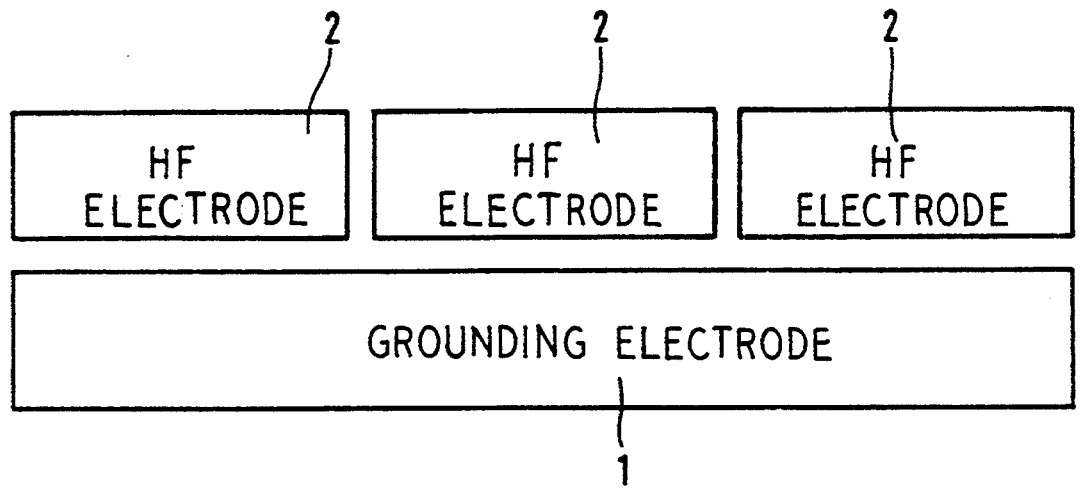
FIG. 1 is a schematic view of a first embodiment of an electrode pair of the invention.

The grounding electrode 1 and an HF electrode 2 segmented into three parts are shown in FIG. 1. One of the surface elements 2 can be constantly driven with high-frequency energy, so that a constant gas discharge burns. The area of this auxiliary discharge relative to the total area, or the area distribution, is selected such that the laser does not yet laser, since the gain is not adequate. Not only can this main discharge be ignited more reliably and with lower ignition energy as a result of these techniques, but the homogeneity of the voltage distribution is also improved and a finer control of the output power of the laser can also be achieved by exciting a suitable electrode surface.

Figure 2:
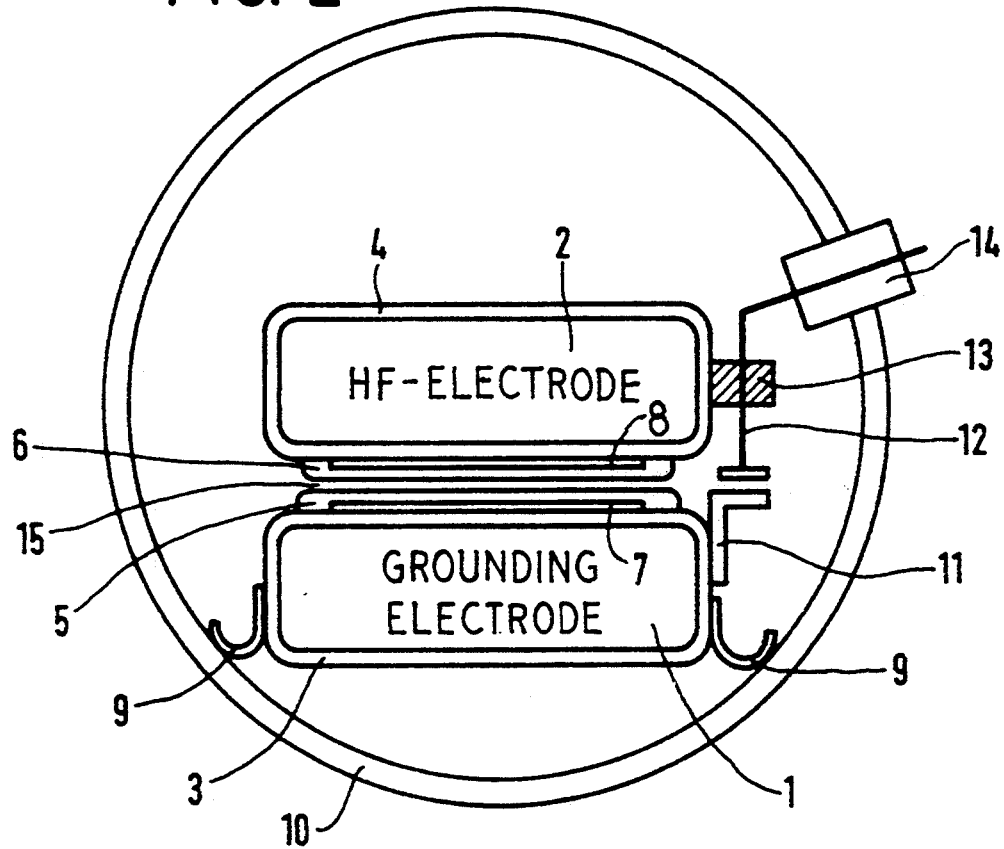
FIG. 2 is a sectional view of another embodiment of the invention comprising an additional auxiliary discharge path.

FIG. 2 shows a stripline laser, whereby the grounding electrode and HF electrode are each respectively constructed of a carrier part 3, 4 having a mechanically stable profile and of a plate-shaped electrode surface 5, 6 that faces toward the discharge path 15 and has integrated cooling channels 7, 8. The laser interior is terminated in vacuum-tight fashion by a jacket tube 10 and by face plates that are not shown in the figure. A preferred distribution of the high-frequency field can be achieved by connecting the grounded electrode to the jacket tube 10 with springs 9. Additional electrodes 11 and 12 that form an auxiliary discharge path are shown roughly parallel to the electrode surfaces 5 and 6. The electrode 1 11 can thereby be directly connected to the grounded electrode 3, 5 or can-even be formed by the latter, whereas the electrode 12 is fixed by an insulating mount 13 and is supplied with ignition energy by an HF bushing 14 situated at the jacket tube 10.

The auxiliary discharge can be driven with HF energy or with a DC voltage source. Just as in the segmented HF electrode set forth above, ions are generated in the auxiliary discharge path, these ions propagating into the region of the actual discharge path and seeing to an improved ignitability of the main discharge therein. It is advantageous to provide a plurality of auxiliary discharges uniformly distributed along the electrode surfaces 5, 6. An improved propagation of the ionization along the discharge path can be achieved by pulsing these localized auxiliary discharges. The auxiliary discharge can either burn continuously or can be ignited synchronously with the main discharge. When the ignition is facilitated with additional electrodes 11 and 12, the ignition energy can be supplied either separately or via the lead of the main discharge path. The embodiment having the external auxiliary discharge is especially advantageous insofar as the optical space of the stripline is not disturbed and the structure of the cooling channels need not be modified.

The ignition voltage of approximately 500 V that was previously required can be substantially reduced in the direction of the value of the maintaining voltage with the stripline laser of the invention, the value thereof varying dependent on the electrode spacing. This is accompanied by a shortening of the ignition time. The ignition time that is more or less variable without the techniques of the invention assumes a practically constant, short value due to the pre-ionization. The laser can also be operated with shorter duty cycles due to the pre-ionization, i.e. the range of control of the light power becomes greater.

Although various minor changes and modifications might be proposed by those skilled in the art, it will be understood that we wish to include within the scope of the patent warranted hereon all such changes and modifications as reasonably come within our contribution to the art.

We claim as our invention:

1. In an HF-excited, diffusion-cooled $CO_2$ stripline laser formed of a vacuum-tight jacket tube having a $CO_2$ lasing gas therein and a grounding electrode adjacent a high frequency electrode each of which has a substantially rectangular and flat electrode surface facing toward each other and forming a discharge gap as a laser discharge path between the two surfaces, wherein the grounding electrode and high frequency electrode are provided with cooling channels, and wherein resonator mirrors are provided to form an unstable resonator, the improvement comprising:

said HF electrode being segmented into at least two electrically separate surface elements, a separate HF feed connected to one of the surface elements so that an auxiliary discharge is ignited at a part of the laser discharge path between the one surface element and said grounding electrode so that ions generated in the auxiliary discharge propagate into adjacent parts of said laser discharge path and provide faster ignition with less ignition energy, and an area of said one surface element for said auxiliary discharge compared to a total area of all surface elements is selected such that the laser does not yet lase since a gain in the laser up to ignition of a main discharge at remaining parts of the discharge path lies below a threshold of the laser.

2. A laser according to claim 1 wherein said HF source connected to said one surface element causes said auxiliary discharge to constantly burn.

3. In an HF-excited, diffusion-cooled $CO_2$ stripline laser formed of a vacuum-tight jacket tube having a $CO_2$ lasing gas therein and a grounding electrode adjacent a high frequency electrode each of which has a plate-shaped surface electrode facing toward each other and forming a discharge gap as a laser discharge path between the two surfaces, wherein the grounding electrode and high frequency electrode are provided with cooling channels, and wherein resonator mirrors are provided to form an unstable resonator, the improvement comprising:

an additional electrode structure provided at least at one location alongside said discharge gap, said additional electrode structure having an energy source connected thereto and forming an auxiliary discharge path at which an auxiliary discharge is ignited; and the auxiliary discharge being adjacent to the discharge path so that at least a portion of ions generated in the auxiliary discharge are present at a region of the laser discharge path for faster ignition thereof with less ignition energy.

4. A stripline laser according to claim 3 wherein said additional electrode structure comprises an additional electrode alongside said high frequency electrode.

5. A stripline laser according to claim 4 wherein said additional electrode structure further comprises an additional grounding electrode connected to and extending from said grounding electrode, and facing and adjacent to said additional electrode.

6. A stripline laser according to claim 3 wherein said energy source is an HF energy source.

7. A stripline laser according to claim 3 wherein said energy source is a DC voltage source.

8. A stripline laser according to claim 3 wherein a plurality of said additional electrode structures are provided along said discharge gap to provide a plurality of auxiliary discharges.

* * * * *